United States Patent
Yiu et al.

(10) Patent No.: US 11,147,000 B2
(45) Date of Patent: Oct. 12, 2021

(54) GENERATION NODE-B (GNB), USER EQUIPMENT (UE) AND METHODS FOR HANDOVER IN NEW RADIO (NR) SYSTEMS

(71) Applicant: Apple Inc., Cupertino, CA (US)

(72) Inventors: Candy Yiu, Portland, OR (US); Kyeongin Jeong, Yongin-si (KR); Sudeep K. Palat, Cheltenham (GB); Richard C. Burbidge, Shrivenham (GB); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/473,235

(22) PCT Filed: Dec. 22, 2017

(86) PCT No.: PCT/US2017/068287
§ 371 (c)(1),
(2) Date: Jun. 24, 2019

(87) PCT Pub. No.: WO2018/128862
PCT Pub. Date: Jul. 12, 2018

(65) Prior Publication Data
US 2019/0327651 A1    Oct. 24, 2019

Related U.S. Application Data

(60) Provisional application No. 62/443,524, filed on Jan. 6, 2017.

(51) Int. Cl.
*H04W 36/00* (2009.01)
*H04L 5/00* (2006.01)

(52) U.S. Cl.
CPC ....... *H04W 36/0094* (2013.01); *H04L 5/0048* (2013.01); *H04W 36/0058* (2018.08)

(58) Field of Classification Search
CPC .......... H04W 36/0094; H04W 36/0058; H04L 5/0048
See application file for complete search history.

(56) References Cited

U.S. PATENT DOCUMENTS 9,603,073 B2 *   3/2017   Jung ................ H04W 36/0072
2013/0196675 A1   8/2013   Xiao et al.
(Continued)

OTHER PUBLICATIONS

"International Application Serial No. PCT/US2017/068287, International Search Report dated Apr. 18, 2018", 3 pgs.
(Continued)

*Primary Examiner* — Jae Y Lee
*Assistant Examiner* — Chuong M Nguyen
(74) *Attorney, Agent, or Firm* — Kowert, Hood, Munyon, Rankin & Goetzel, P.C.

(57) ABSTRACT

Embodiments of a generation Node-B (gNB), User Equipment (UE) and methods for communication are generally described herein. The gNB may receive, from the UE, a first measurement report that indicates a first signal quality measurement based on new radio synchronization signals (NR-SS). The gNB may determine, based on reception of the first measurement report, a transmission direction for transmission of channel state information reference signals (CSI-RS) for a second RRM measurement at the UE based on the CSI-RS. The gNB may receive, from the UE, a second measurement report that indicates a second signal quality measurement based on the CSI-RS. The gNB may determine, based at least partly on the first and second signal quality measurements, whether to initiate a handover of the UE from a serving cell to a neighbor cell.

26 Claims, 10 Drawing Sheets

(56) References Cited

U.S. PATENT DOCUMENTS

| | | | |
|---|---|---|---|
| 2014/0080484 A1* | 3/2014 | Centonza | H04W 36/0072 455/436 |
| 2014/0241323 A1 | 8/2014 | Park et al. | |
| 2015/0049737 A1* | 2/2015 | Yang | H04W 36/30 370/332 |
| 2015/0092768 A1* | 4/2015 | Ng | H04J 11/0069 370/350 |
| 2015/0146561 A1 | 5/2015 | Jung et al. | |
| 2015/0195731 A1* | 7/2015 | Jung | H04L 5/0048 370/252 |
| 2015/0237541 A1* | 8/2015 | Kim | H04W 36/0088 370/331 |
| 2016/0037425 A1 | 2/2016 | Van Lieshout et al. | |
| 2017/0230869 A1* | 8/2017 | Kubota | H04W 36/0005 |
| 2017/0331670 A1* | 11/2017 | Parkvall | H04J 11/0056 |
| 2019/0387441 A1* | 12/2019 | Koskela | H04W 36/30 |

OTHER PUBLICATIONS

"International Application Serial No. PCT/US2017/068287, Written Opinion dated Apr. 18, 2018", 10 pgs.

Lars, Lindbom, et al., "Enhanced Inter-cell Interference Coordination for Heterogeneous Networks in LTE-Advanced: A Survey", (Dec. 7, 2011), 1-18.

* cited by examiner

GENERATION NODE-B (GNB), USER EQUIPMENT (UE) AND METHODS FOR HANDOVER IN NEW RADIO (NR) SYSTEMS

PRIORITY CLAIM

This application is a U.S. National Stage Filing under 35 U.S.C. 371 from International Application No. PCT/US2017/068287, filed Dec. 22, 2017 and published in English as WO 2018/128862 on Jul. 12, 2018, which claims the benefit of priority to U.S. Provisional Patent Application Ser. No. 62/443,524, filed Jan. 6, 2017, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to usage of transmit-receive points (TRPs). Some embodiments relate to handover, including handover based on reference signals.

BACKGROUND

Base stations and mobile devices operating in a cellular network may exchange data. Various techniques may be used to improve capacity and/or performance, in some cases, including communication in accordance with new radio (NR) techniques. In an example, a mobile device at a cell edge may experience performance degradation and may benefit from a handover to another cell. An overall benefit to the system may also be realized as a result of the handover. Accordingly, there is a general need for methods and systems to perform operations related to handover in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
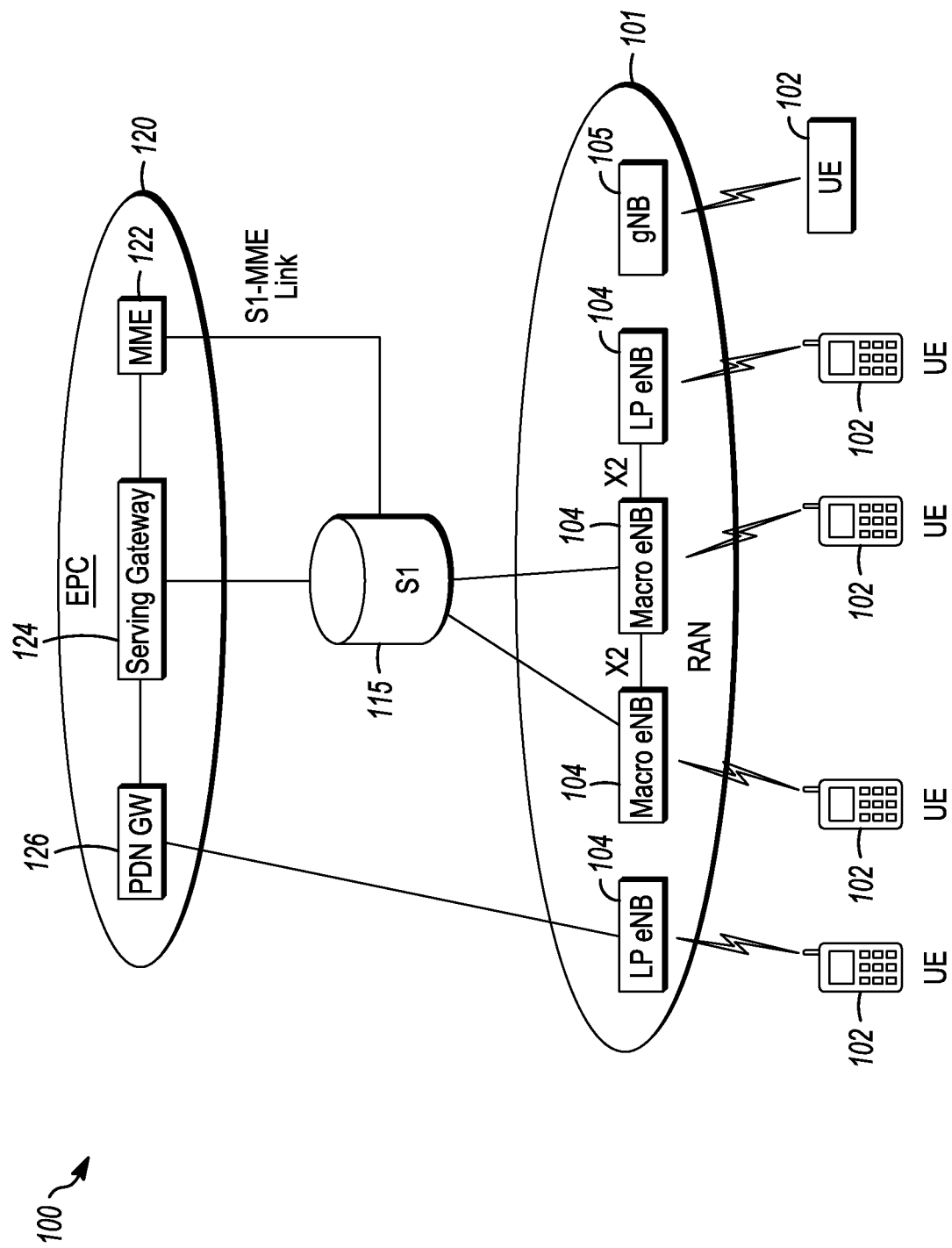
FIG. 1 is a functional diagram of an example network in accordance with some embodiments.

FIG. 1 is a functional diagram of an example network in accordance with some embodiments. In some embodiments, the network 100 may be a Third Generation Partnership Project (3GPP) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1. Some embodiments may not necessarily include all components shown in FIG. 1, and some embodiments may include additional components not shown in FIG. 1.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1 or to the number of gNBs 105 shown in FIG. 1. In some embodiments, the network 100 may not necessarily include eNBs 104. Embodiments are also not limited to the connectivity of components shown in FIG. 1.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical downlink control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
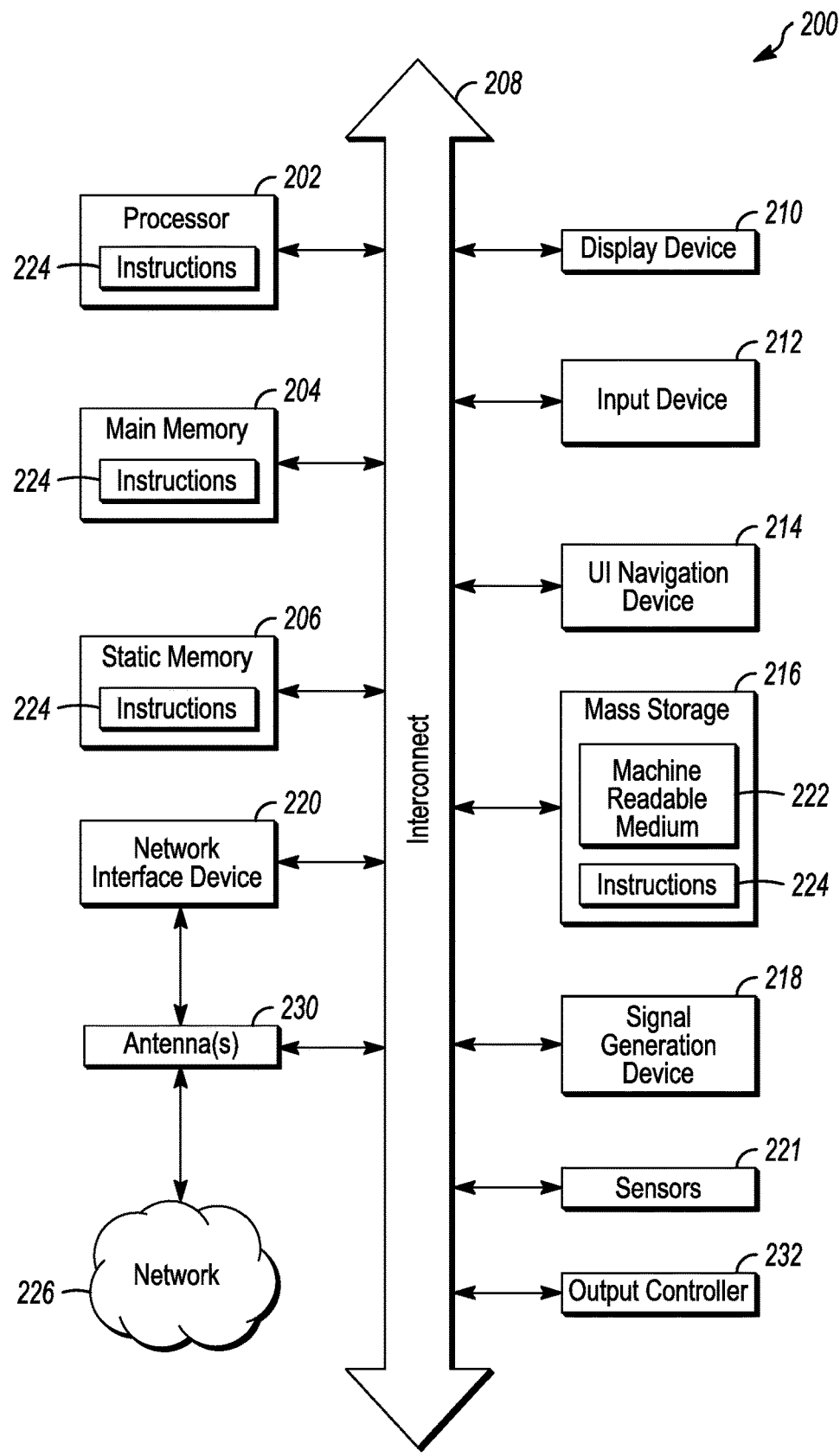
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
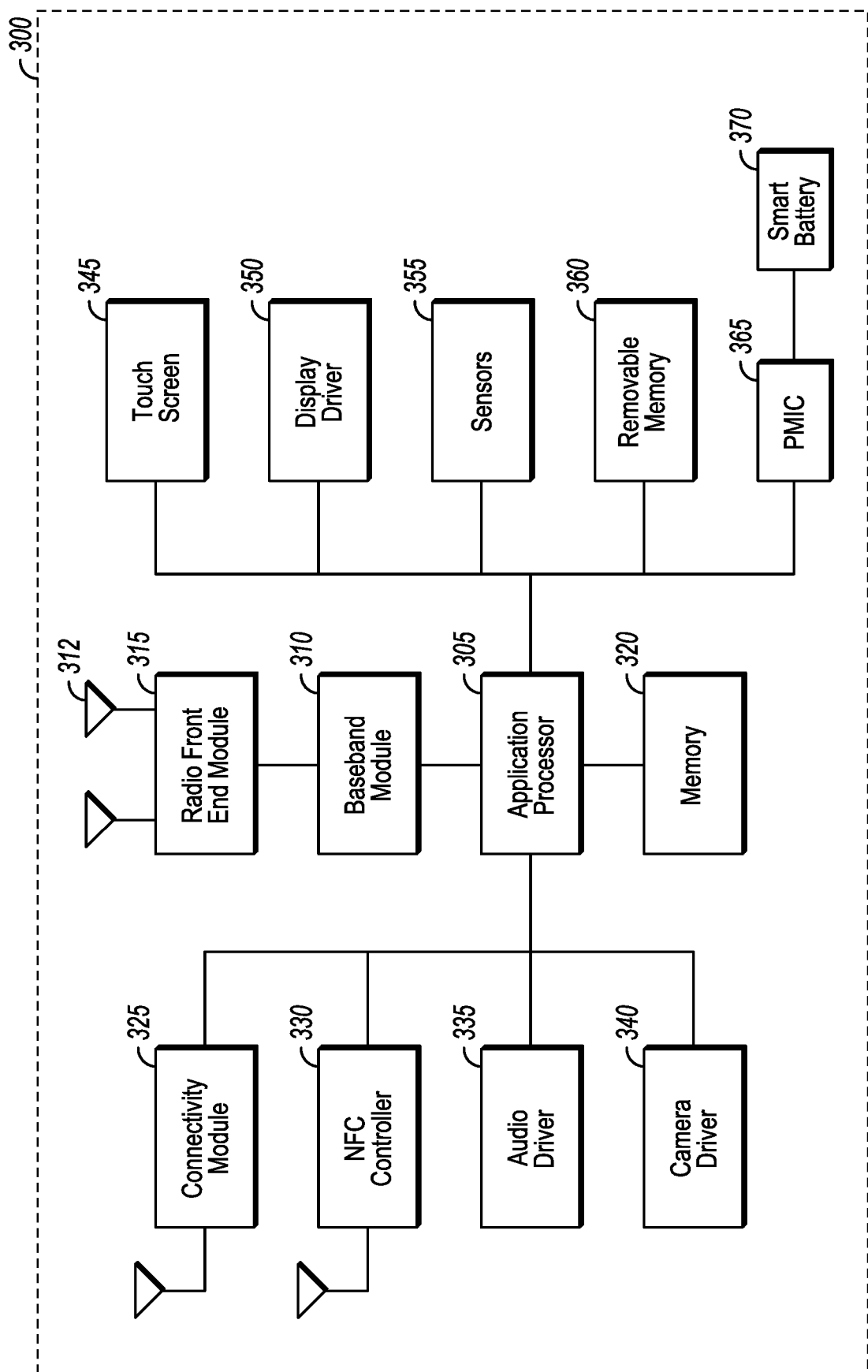
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIN) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
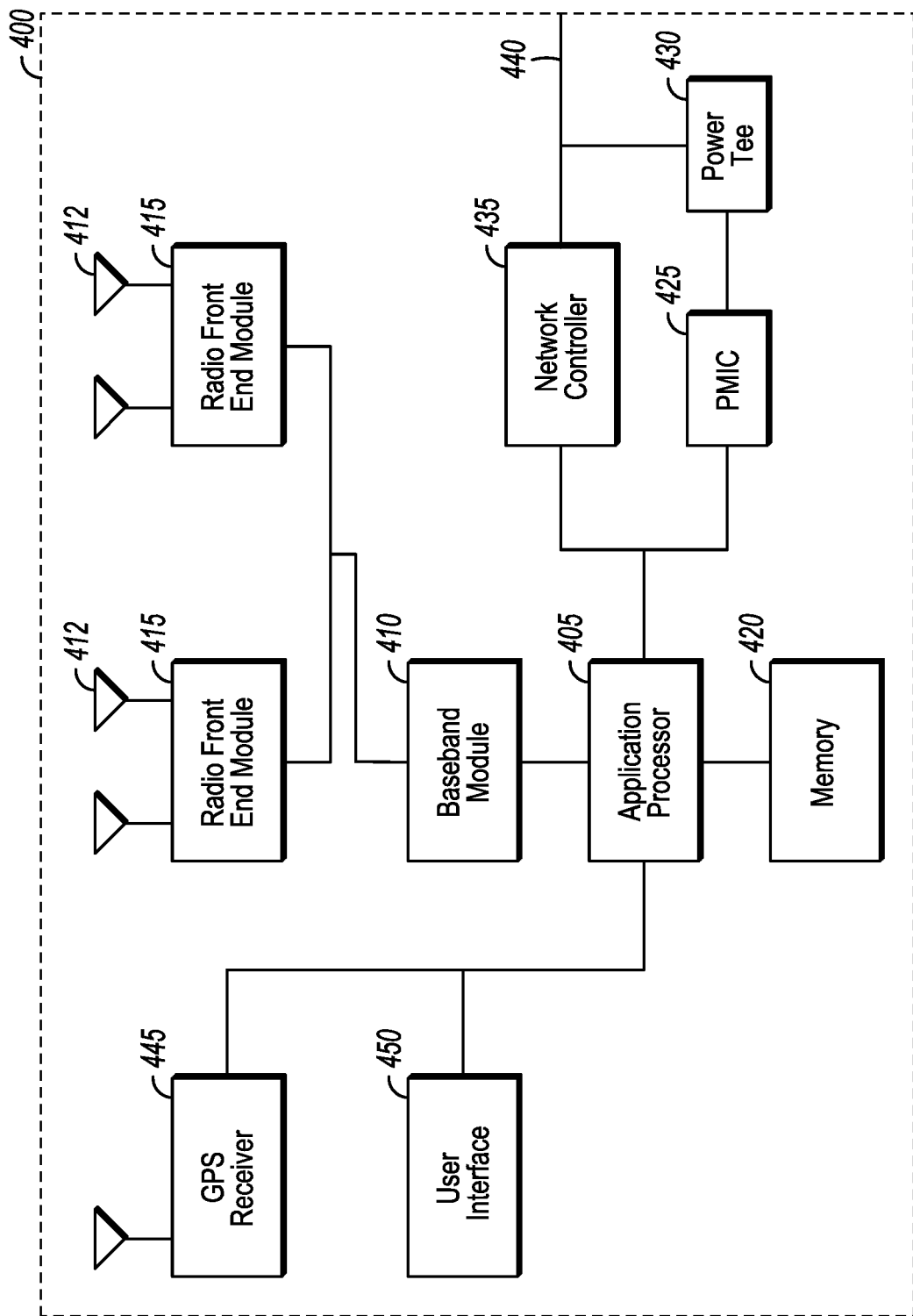
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
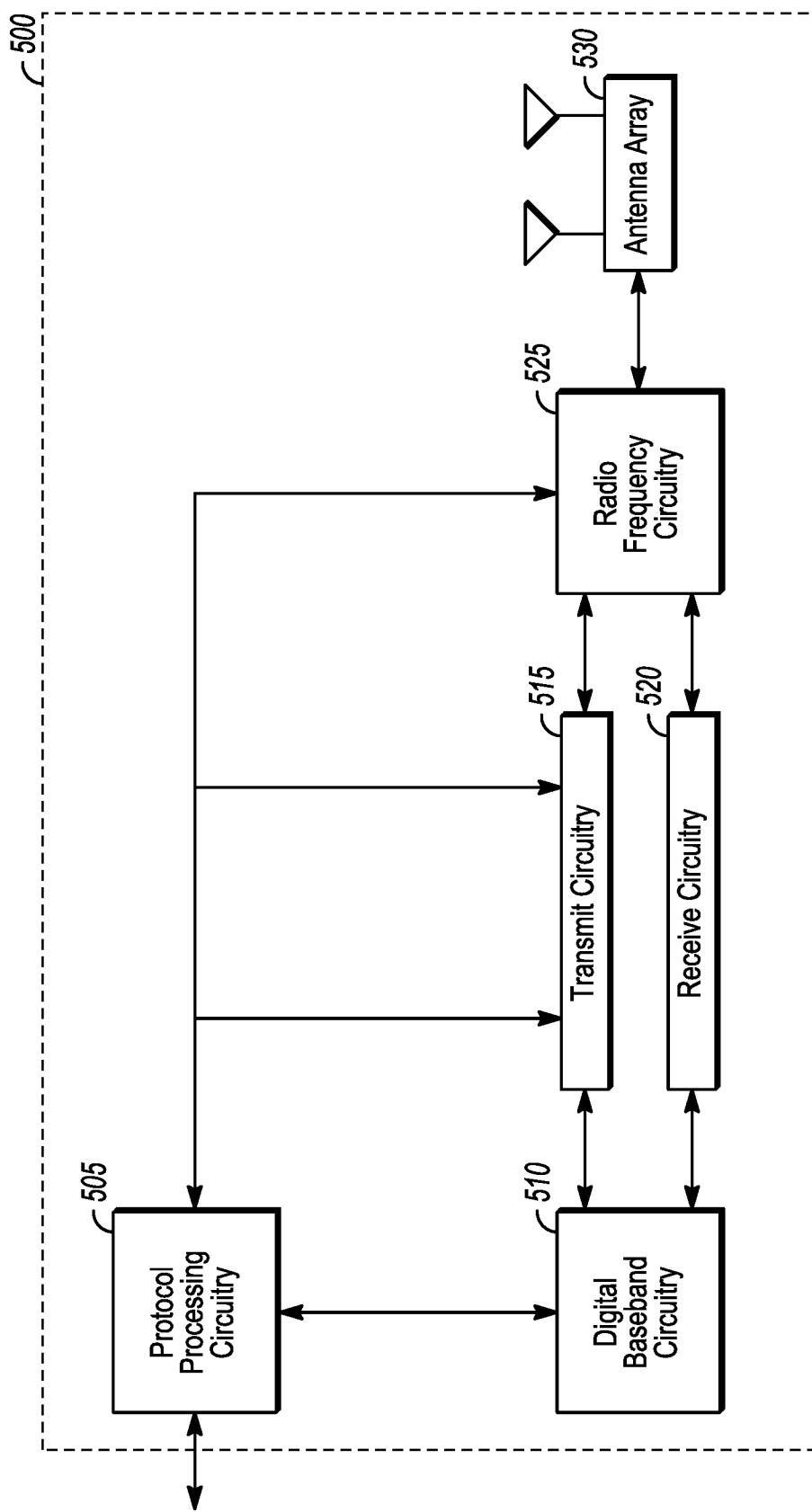
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
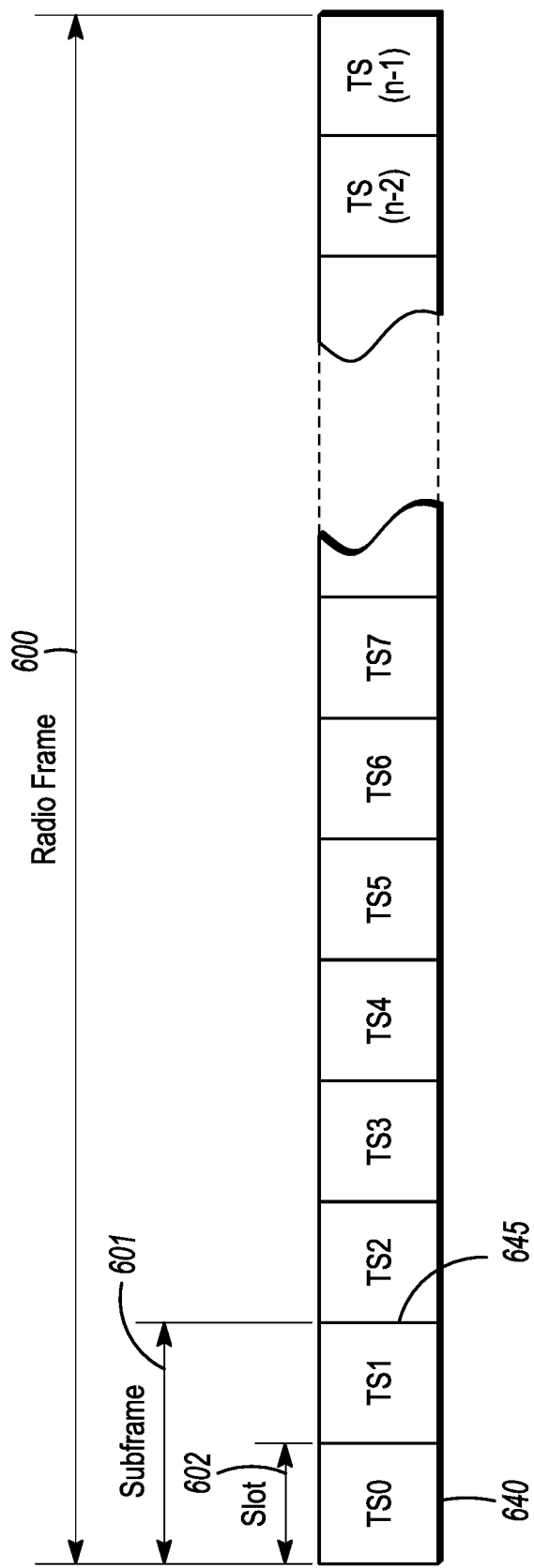
FIG. 6 illustrates an example radio frame structure in accordance with some embodiments.
Figure 7A:
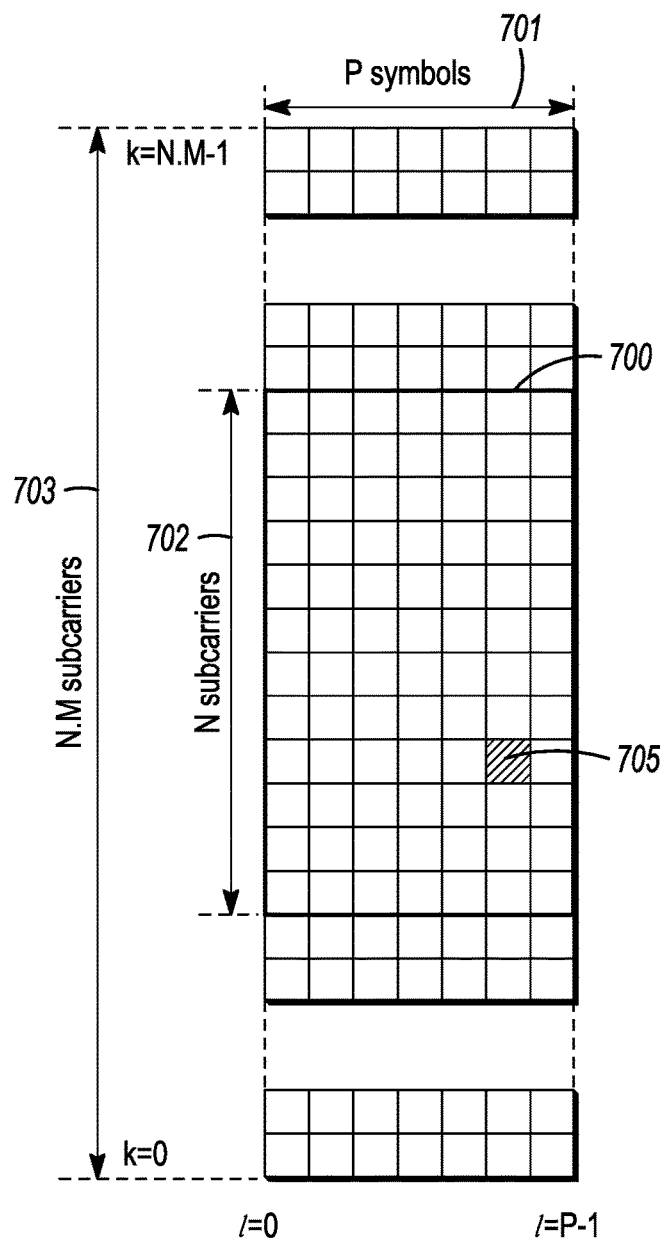
FIG. 7A and FIG. 7B illustrate example frequency resources in accordance with some embodiments.
Figure 7B:
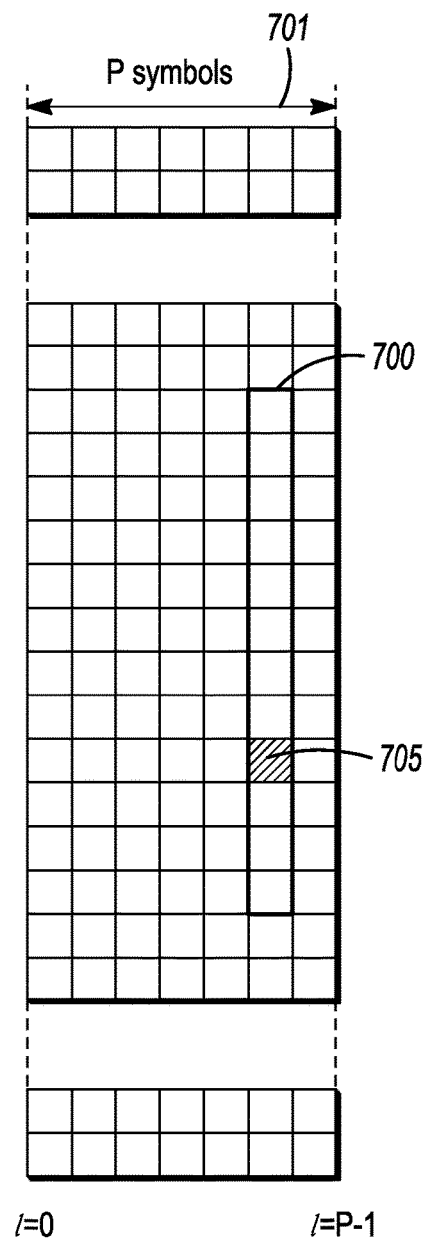

FIG. 6 illustrates an example of a radio frame structure in accordance with some embodiments. FIG. 7A and FIG. 7B illustrate example frequency resources in accordance with some embodiments. It should be noted that the examples shown in those figures may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in those figures. Although some of the elements shown in the examples of those figures may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

In some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, 1) where k is the index number of subcarrier, in the range 0 to N.M−1 (as indicated by 703), where N is the number of subcarriers in a resource block, and M is the number of resource blocks spanning a component carrier in the frequency domain.

In accordance with some embodiments, the gNB 105 may transmit a first control message that indicates a first radio resource management (RRM) measurement at a UE 102 based on new radio synchronization signals (NR-SS). The gNB 105 may receive, from the UE 102, a first measurement report that indicates a first signal quality measurement based on the NR-SS. The gNB 105 may determine, based on reception of the first measurement report, a transmission direction for transmission of channel state information reference signals (CSI-RS) for a second RRJ\1 measurement at the UE 102 based on the CSI-RS. The gNB 105 may transmit a second control message that indicates the second RRM measurement. The gNB 105 may transmit the CSI-RS in 15 accordance with the determined transmission direction. The gNB 105 may receive, from the UE 102, a second measurement report that indicates a second signal quality measurement based on the CSI-RS. The gNB 105 may determine, based at least partly on the first and second signal quality measurements, whether to initiate a handover of the UE 102 from a serving cell to a neighbor cell. These embodiments are described in more detail below.

Figure 8:
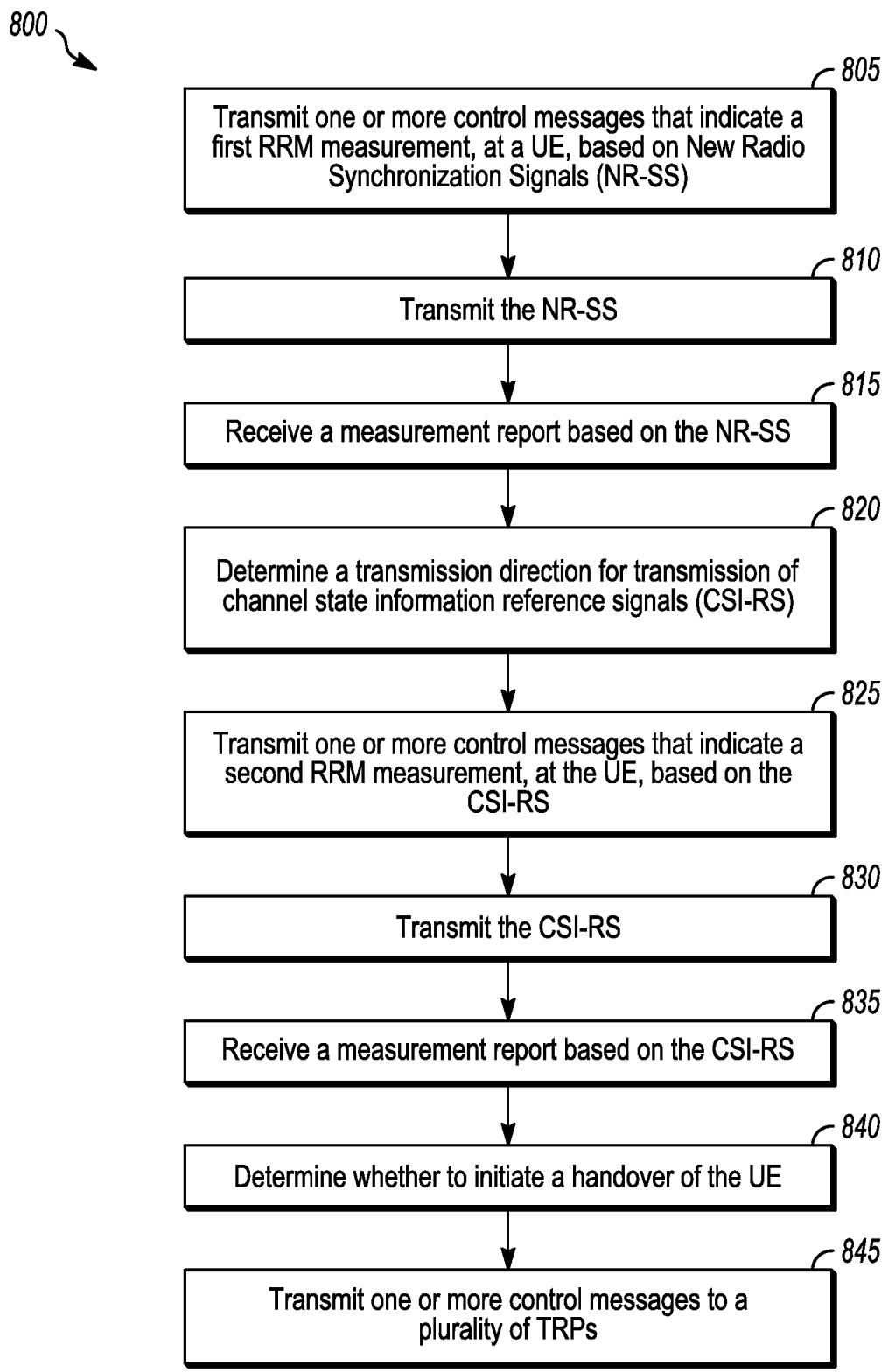
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the 25 method 800 are not necessarily limited to the chronological order that is shown in FIG. 8. In describing the method 800, reference may be made to one or more of FIGS. 1-6, 7A, 7B and 9-10, although it is understood that the method 800 may be practiced with any other suitable systems, interfaces and components.

In some embodiments, a gNB 105 may perform one or more operations of the method 800, but embodiments are not limited to performance of the method 800 and/or operations of it by the gNB 105. In some embodiments, an eNB 104 configured to operate as a gNB 105 may perform one or more operations of the method 800 (and/or similar operations). In some embodiments, an eNB 104 may perform one or more operations of the method 800 (and/or similar operations). In some embodiments, the UE 102 may perform one or more operations of the method 800 (and/or similar operations). Accordingly, although references may be made to performance of one or more operations of the method 800 by the gNB 105 in descriptions herein, it is understood that the eNB 104 and/or UE 102 may perform the same operation(s), similar operation(s) and/or reciprocal operation(s), in some embodiments.

In some embodiments, the gNB 105 may be arranged to operate in accordance with a New Radio (NR) standard and/or protocol, although the scope of embodiments is not limited in this respect. While the method 800 and other methods described herein may refer to eNBs 104, gNBs 105 or UEs 102 operating in accordance with 3GPP standards, 5G standards, NR standards and/or other standards, embodiments of those methods are not limited to just those eNBs 104, gNBs 105 or UEs 102 and may also be practiced on other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. The method 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800 and 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 805, the gNB 105 may transmit one or more control 5 messages that indicate a first radio resource management (RRM) measurement at the UE 102 based on new radio synchronization signals (NR-SS). Any suitable type(s) of control message may be used. In a non-limiting example, a measurement report configuration message may be transmitted, although the scope of embodiments is not limited in this respect.

The one or more control messages may indicate and/or include information related to the first RRM measurement and/or the NR-SS. In some embodiments, the control message(s) may indicate and/or include one or more types of signal quality measurements to be performed in the first RRM measurement. Non-limiting examples include a signal-to-interference-plus-noise 15 ratio (SINR), a reference signal SINR (RS-SINR), a signal-to-noise ratio (SNR), a reference signal received power (RSRP), a reference signal received quality (RSRQ) and/or other. In some embodiments, the control message(s) may indicate and/or include one or more thresholds, including but not limited to thresholds related to signal quality measurement(s). For instance, a transmission of a measurement report by the UE may be triggered based on one or more comparisons between signal quality measurement(s) and threshold(s). In some embodiments, control message(s) may indicate and/or include one or more event triggers for the first RRM measurement. For instance, the UE 102 may use the event triggers to determine whether to transmit a measurement report based at 25 least partly on signal quality measurements. In some embodiments, the control message(s) may include and/or indicate a predetermined threshold for the signal quality measurement to trigger a transmission of the measurement report, by the UE 102.

In some embodiments, the control message(s) may indicate and/or include time resources used for the NR-SS; frequency resources used for the NR-SS; a cell identifier (cell ID) on which the NR-SS may be based; and/or other information. The examples herein of information that may be included in the control message(s) are not limiting. In some embodiments, other information may be included, in addition to or instead of information described in the examples herein. In some embodiments, the control message(s) may include information described in multiple examples herein.

At operation 810, the gNB 105 may transmit the NR-SS. In some embodiments, the NR-SS may be configured based on a cell in which the gNB 105 operates. In some embodiments, the NR-SS may be based at least partly on a cell identifier (cell ID) of the cell in which the gNB 105 operates.

In some embodiments, the NR-SS may be transmitted in accordance with a first beam-width. In a non-limiting example, omni-directional transmission may be used. In another non-limiting example, a relatively wide beam-width may be used, such as 120 degrees or other value.

In some embodiments, the NR-SS may be transmitted in accordance with an orthogonal frequency division multiple access (OFDMA) technique and/or orthogonal frequency division multiplexing (OFDM) technique, although the scope of embodiments is not limited in this respect.

In some embodiments, the NR-SS may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

At operation 815, the gNB 105 may receive a measurement report based on the NR-SS. In some embodiments, the measurement report may be received from the UE 102, although the scope of embodiments is not limited in this respect. In some embodiments, the measurement report may include and/or indicate information related to signal quality measurements based on reception of NR-SS at the UE 102. Other information may be included, in some embodiments.

In some embodiments, the gNB may transmit a control message that indicates a trigger condition for transmission, by the UE 102, of a measurement report based on the NR-SS. The trigger condition may be based on a signal quality measurement for the NR-SS. The signal quality measurement may be a reference signal received power (RSRP), a reference signal received quality (RSRQ) or a reference signal signal-to-interference-plus-noise ratio (RS-SINR).

At operation 820, the gNB 105 may determine a transmission direction. In some embodiments, the gNB 105 may determine the transmission direction based at least partly on a reception of the measurement report at operation 815. In some embodiments, the gNB 105 may determine the transmission direction for usage in transmission of other signals, including but not limited to channel state information reference signals (CSI-RS). For instance, the gNB 105 may determine the transmission direction for transmission of CSI-RS for a second RRM measurement at the UE 102 based on the CSI-RS.

Embodiments are not limited to determination of a transmission direction. For instance, the gNB 105 may determine a location of the UE 102 based at least partly on the reception of the measurement report at operation 815.

At operation 825, the gNB 105 may transmit one or more control messages that indicate an RRM measurement, at the UE 102, based on the CSI-RS. Any suitable type(s) of control message may be used. In a non-limiting example, a measurement report configuration message may be transmitted, although the scope of embodiments is not limited in this respect. The one or more control messages may indicate and/or include information related to the second RRM measurement and/or the CSI-RS. In some embodiments, the control message(s) may indicate and/or include information that may be similar to, related to and/or analogous to information described for the one or more control messages (of operation 805) for the first RRM measurement based on the NR-SS.

The one or more control messages may include one or more of:

types of signal quality measurements to be performed in the second RRM measurement (including but not limited to a SINR, RS-SINR, SNR, RSRP, RSRQ and/or other); one or more thresholds (such as threshold(s) related to signal quality measurement(s) and/or other); one or more event triggers for the second RRM measurement; a predetermined threshold for the signal quality measurement to trigger a transmission of the measurement report, by the UE, based on the CSI-RS; time resources used for the CSI-RS; frequency resources used for the CSI-RS; a cell identifier (cell ID) on which the CSI-RS may be based; and/or other information. In some embodiments, other information may be included, in addition to or instead of information described in the examples herein. In some embodiments, the control message(s) may include information described in multiple examples herein.

At operation 830, the gNB 105 may transmit the CSI-RS. In some embodiments, the gNB 105 may transmit the CSI-RS in accordance with the determined transmission direction. In some embodiments, the gNB 105 may transmit the CSI-RS in accordance with a second beam-width. The second beam-width may be less than the first beam-width, although the scope of embodiments is not limited in this respect.

In some embodiments, the NR-SS may be configured based on a cell in which the gNB 105 operates and the CSI-RS may be configured for the UE 102, although the scope of embodiments is not limited in this respect.

In some embodiments, the gNB 105 may transmit a control message that indicates a mapping between the CSI-RS and a cell identifier (ID) of a cell in which the gNB 105 operates. The control message may include a system information block (SIB), dedicated signaling or a physical layer code.

At operation 835, the gNB 105 may receive a measurement report based on the CSI-RS. In some embodiments, the measurement report may be received from the UE 102, although the scope of embodiments is not limited in this respect. In some embodiments, the measurement report may include and/or indicate information related to signal quality measurements based on reception of CSI-RS at the UE 102. Other information may be included, in some embodiments.

In some embodiments, the gNB 105 may transmit a control message that indicate a trigger condition for transmission, by the UE 102, of a measurement report based on the CSI-RS. The trigger condition may be based on a signal quality measurement for the CSI-RS. The signal quality measurement may be an RSRP, an RSRQ or an RS-SINR.

In some embodiments, the gNB 105 may receive a measurement report that includes and/or indicates information related to signal quality measurements of both the NR-SS and the CSI-RS. For instance, the gNB 105 may transmit one or more control messages that indicate multiple thresholds, multiple event triggers and/or multiple RRM measurements. The measurement report may be transmitted by the UE 102 if multiple conditions occur. For instance, the UE 102 may transmit the measurement report if a first signal quality measurement based on the NR-SS is greater than a first threshold and if a second signal quality measurement based on the CSI-RS is greater than a second threshold.

In some embodiments, the gNB 105 may transmit one or more control messages that indicate: one or more RRM measurements at the UE 102; and one or more trigger conditions for transmission of one or more measurement reports, by the UE 102, based on the RRM measurement(s). The RRM measurements may be based on one of: new radio synchronization signals (NR-SS) and channel state information reference signals (CSI-RS). The RRM measurements may be further based on one of: a reference signal received power (RSRP), a reference signal received quality (RSRQ) and a reference signal signal-to-interference-plus-noise ratio (RS-SINR). The gNB 105 may, if one of the RRM measurements is based on the NR-SS, transmit the NR-SS. The gNB 105 may, if one of the RRM measurements is based on the CSI-RS, transmit the CSI-RS.

It should be noted that embodiments are not limited to control logic (such as greater than, less than or equal to, greater than or equal to, less than, logical "AND", logical "OR" and/or other) used in examples described herein. Different combinations of such logic operators may be used in some embodiments.

At operation 840, the gNB 105 may determine whether to initiate a handover of the UE 102. The determination may be based at least partly on one or more of: signal quality measurements based on NR-SS from the gNB 105, signal quality measurements based on CSI-RS from the gNB 105, signal quality measurements based on NR-SS from a neighbor cell, signal quality measurements based on CSI-RS from a neighbor cell, signal quality measurements based on NR-SS from a TRP, signal quality measurements based on CSI-RS from a TRP and/or other signal quality measurements.

In some embodiments, the gNB 105 may receive, from the UE 102, a first measurement report that indicates a first signal quality measurement based on the NR-SS. The gNB may receive, from the UE 102, a second measurement report that indicates a second signal quality measurement based on the CSI-RS. The gNB may operate in a serving cell. The gNB 105 may determine, based at least partly on the first signal quality measurement or the second signal quality measurement, whether to initiate a handover of the UE 102 to a neighbor cell.

In some embodiments, the gNB 105 may determine to initiate the handover of the UE 102 to the neighbor cell if a signal quality measurement (such as a signal quality measurement based on the NR-SS, a signal quality measurement based on the CSI-RS and/or other) is less than a predetermined threshold. This example may be extended to include multiple signal quality measurements and/or multiple thresholds.

In some embodiments, the gNB 105 may transmit one or more control messages to indicate a third measurement event based on CSI-RS from a neighbor cell. The gNB 105 may receive a measurement report from the UE 102 that indicates a signal quality measurement based on the CSI-RS from the neighbor cell. The gNB 105 may determine whether to initiate the handover based at least partly on the signal quality measurement based on the CSI-RS from the neighbor cell. For instance, the gNB 105 may determine to initiate the handover if a difference between that signal quality measurement and a signal quality measurement based on CSI-RS from the gNB 105 is greater than a predetermined threshold.

It should be noted that some embodiments may not necessarily include all operations shown in FIG. 8. For instance, in some embodiments, the UE 102 may perform operation based at least partly on operations 805-815, and may not necessarily perform one or more of operations 825-835. In a non-limiting example, the gNB 105 may operate in a serving cell. The gNB 105 may, if a signal quality measurement for the NR-SS is less than or equal to a threshold: determine the transmission direction for transmission of the CSI-RS, transmit the CSI-RS. The gNB 105 may, if the signal quality measurement for the NR-SS is greater than the threshold: determine whether to initiate a handover of the UE 102 to a neighbor cell based on the signal quality measurement for the NR-SS. Accordingly, the gNB 105 may not necessarily transmit the CSI-RS if it is determined that the signal quality measurement for the NR-SS is relatively high (greater than the threshold). Furthermore, the gNB 105 may not necessarily receive the signal quality measurement based on the CSI-RS and therefore may not use such a measurement in the decision to initiate the handover.

At operation 845, the gNB 105 may transmit one or more control messages to a plurality of a plurality of transmit-receive points (TRPs). In some embodiments, the gNB 105 may be located at a different location than at least one of the TRPs. In some embodiments, the gNB 105 may operate in a serving cell, and one or more TRPs may be configured to transmit and/or receive signals to the UE 102. In some embodiments, the gNB 105 may instruct the TRPs (through control messages and/or other techniques) to transmit and/or receive signals. In some embodiments, one or more TRPs may be used instead of the plurality of TRPs described herein.

Some of the embodiments and examples described herein may be extended to include usage of one or more TRPs. For instance, the TRPs may transmit NR-SS and/or CSI-RS. The UE 102 may determine signal quality measurements based on signals (NR-SS, CSI-RS and/or other) received from one or more TRPs, in some embodiments.

In some embodiments, the gNB 105 may transmit, to one or more TRPs of a cell in which the gNB 105 operates, one or more control messages that indicate NR-SS to be transmitted by the TRPs for RRM measurements. The gNB 105 may receive, from the UE 102, a measurement report that indicates a plurality of signal quality measurements based on NR-SS received from the TRPs. The gNB 105 may determine, based on the signal quality measurements, a combined signal quality measurement for the cell in which the gNB 105 operates. The gNB 105 may determine, based at least partly on the combined signal quality measurement, whether to initiate a handover of the UE 102 to a neighbor cell.

In a non-limiting example, the gNB 105 may determine to initiate the handover of the UE 102 to the neighbor cell if the combined signal quality measurement is less than a threshold.

In another non-limiting example, the gNB 105 may receive another measurement report from the UE 102 that indicates a signal quality measurement based on NR-SS received from the neighbor cell. The gNB 105 may determine, based on a comparison of the combined signal quality measurement and the signal quality measurement based on the NR-SS from the neighbor cell, whether to initiate a handover of the UE 102 to the neighbor cell.

In some embodiments, an apparatus of a gNB 105 may comprise memory. The memory may be configurable to store at least a portion of a control message. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of one or more control messages. The apparatus of the UE 102 may include a transceiver to transmit the one or more control messages. The transceiver may transmit and/or receive other blocks, messages and/or other elements.

Figure 9:
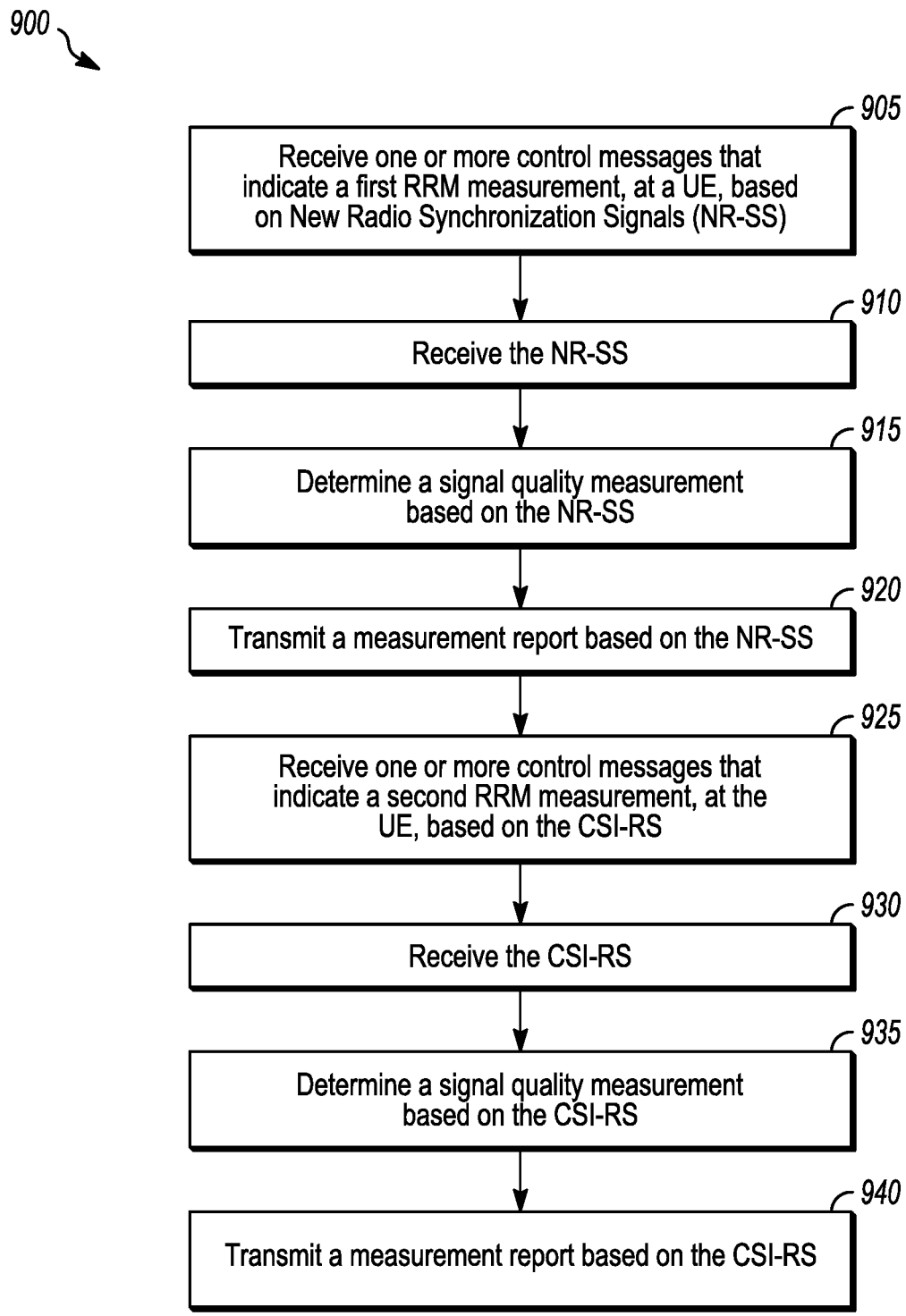
FIG. 9 illustrates the operation of another method of communication in accordance with some embodiments.

FIG. 9 illustrates the operation of another method of communication in accordance with some embodiments. Embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to one or more of the figures described herein, although it is understood that the method 900 may be practiced with any other suitable systems, interfaces and components. In addition, embodiments of the method 900 may be applicable to UEs 102, eNBs 104, gNBs 105, APs, STAs and/or other wireless or mobile devices. The method 900 may also be applicable to an apparatus of a UE 102, eNB 104, gNB 105 and/or other device described above.

In some embodiments, a UE 102 may perform one or more operations of the method 900, but embodiments are not limited to performance of the method 900 and/or operations of it by the UE 102. In some embodiments, the eNB 104 and/or gNB 105 may perform one or more operations of the method 900 (and/or similar operations). In some embodiments, an eNB 104 may be configured to operate as a gNB 105 and may perform one or more operations of the method 900 (and/or similar operations). Although references may be made to performance of one or more operations of the method 900 by the UE 102 in descriptions herein, it is understood that the eNB 104 and/or gNB 105 may perform the same operation(s), similar operation(s) and/or reciprocal operation(s), in some embodiments.

It should be noted that the method 800 may be practiced by a gNB 105 and may include exchanging of elements, such as frames, signals, messages and/or other elements, with a UE 102. Similarly, the method 900 may be practiced by a UE 102 and may include exchanging of such elements with a gNB 105. In some cases, operations and techniques described as part of the method 800 may be relevant to the method 900. In some cases, operations and techniques described as part of the method 900 may be relevant to the method 800. In addition, embodiments of the method 900 may include one or more operations performed by the UE 102 that may be the same as, similar to or reciprocal to one or more operations described herein performed by the gNB 105 (including but not limited to operations of the method 800). For instance, an operation of the method 800 may include transmission of an element (such as a frame, block, message and/or other) by the gNB 105 and the method 900 may include reception of a same or similar element by the UE 102.

In addition, previous discussion of various techniques and concepts may be applicable to the method 900 in some cases, including NR-SS, CSI-RS, RRM measurements, event triggers, thresholds, signal quality measurements, measurement reports and/or others. In addition, the examples shown in one or more of the figures may also be applicable, in some cases, although the scope of embodiments is not limited in this respect.

In some embodiments, the UE 102 may be arranged to operate in accordance with a New Radio (NR) protocol and/or standard, although the scope of embodiments is not limited in this respect.

At operation 905, the UE 102 may receive one or more control messages that indicate a first RRM measurement, at a UE 102, based on new radio synchronization signals (NR-SS). At operation 910, the UE 102 may receive the NR-SS. At operation 915, the UE 102 may determine a signal quality measurement based on the NR-SS. At operation 920, the UE 102 may transmit a measurement report based on the NR-SS.

At operation 925, the UE 102 may receive one or more control messages that indicate a second RRM measurement, at a UE 102, based on channel state information reference signals (CSI-RS). At operation 930, the UE 102 may receive the CSI-RS. At operation 935, the UE 102 may determine a signal quality measurement based on the CSI-RS. At operation 940, the UE 102 may transmit a measurement report based on the CSI-RS.

It should be noted that some embodiments may not necessarily include all operations shown in FIG. 9. For instance, the gNB 105 may not necessarily indicate the second RRM measurement. Therefore, the UE 102 may not necessarily perform operation 935 and/or 940.

In some embodiments, one or more control messages received at the UE 102 may indicate multiple thresholds, multiple RRM measurements, multiple signal quality measurements and/or multiple event triggers. For instance, techniques described herein may be extended to cases that include multiple thresholds, multiple RRM measurements, multiple signal quality measurements and/or multiple event triggers.

In some embodiments, the UE 102 may receive, from the gNB 105, one or more control messages that indicate a first measurement event that occurs if a first signal quality measurement based on received NR-SS is greater than a first threshold. The NR-SS may be configured for a cell in which the gNB 105 operates, in some cases. In some embodiments, the one or more control messages may indicate a second measurement event that occurs if a second signal quality measurement based on received CSI-RS is greater than a second threshold. The CSI-RS may be configured for the UE 102, in some cases. In some embodiments, the UE 102 may determine the first and second signal quality measurements. The UE 102 may, if both the first and second measurement events occur: transmit a measurement report that includes the first and second signal quality measurements. In some embodiments, the one or more control messages may include the first and second thresholds.

In some embodiments, if either of the first and second measurement events does not occur, the UE 102 may: monitor a time-to-trigger (TTT); refrain from transmission of the measurement report while the TTT is monitored and while either of the first and second measurement events does not occur; and transmit the measurement report after an expiration of the TTT.

In some embodiments, the UE 102 may be arranged to operate in accordance with a New Radio (NR) protocol. The cell in which the gNB 105 operates may be a serving cell. The NR-SS may be received from the gNB 105. In some embodiments, the first measurement event may be configurable to be one of a plurality of events that includes: an A1 event that occurs if the first signal quality measurement is greater than the first threshold; an A2 event that occurs if the first signal quality measurement is less than or equal to the first threshold; and an A4 event that occurs if another signal quality measurement based on NR-SS received from a neighbor cell is greater than another threshold. The plurality of events may include other events, in some embodiments.

In some embodiments, the UE 102 may receive, from the gNB 105, one or more control messages that indicate a first measurement event that occurs if a first signal quality measurement based on received NR-SS is greater than a first threshold. The NR-SS may be configured for a cell in which the gNB 105 operates, in some cases. In some embodiments, the one or more control messages may indicate a second measurement event that occurs if a second signal quality measurement based on received CSI-RS is greater than a second threshold. The CSI-RS may be configured for the UE 102, in some cases. The UE 102 may determine the first signal quality measurement. The UE 102 may, if the first measurement event occurs: transmit a first measurement report that includes the first signal quality measurement. The UE 102 may determine the second signal quality measurement. The UE 102 may, if the second measurement event occurs: transmit a second measurement report that includes the second signal quality measurement. In some embodiments, the one or more control messages may include the first and second thresholds.

Figure 10:
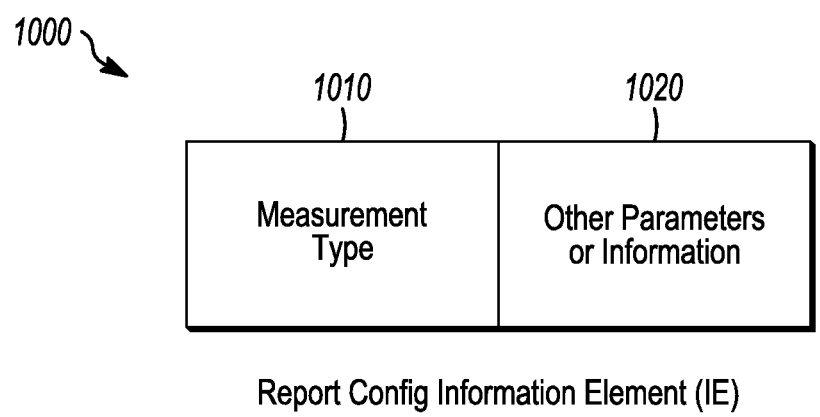
FIG. 10 illustrates an example element that may be exchanged in accordance with some embodiments.

FIG. 10 illustrates an example element that may be exchanged in accordance with some embodiments. It should be noted that the example shown in FIG. 10 may illustrate some or all of the concepts and techniques described herein in some cases, but embodiments are not limited by the examples. For instance, embodiments are not limited by the name, number, type, size, ordering, arrangement and/or other aspects of the operations, time resources, symbol periods, frequency resources, subcarriers, REs, transmitted/ received elements (such as reference signals, PSS, SSS and/or other), bandwidths and other elements as shown in FIG. 10. Although some of the elements shown in the example of FIG. 10 may be included in a 3GPP LTE standard, 5G standard, NR standard and/or other standard, embodiments are not limited to usage of such elements that are included in standards.

The element 1000 labeled as the "ReportConfig" Information Element (IE)" may be used to communicate information related to one or more RRM measurements, although the scope of embodiments is not limited in this respect. For instance, one or more of the control messages described in methods 800 and 900 may be the same as or similar to the element 1000, in some embodiments. Embodiments are not limited to usage of the element 1000, as any suitable control message, IE and/or other element may be used to communicate information related to the RRM measurement(s), in some embodiments.

In some embodiments, the element 1000 may include a measurement type 1010. The element 1000 may include any number (including zero) of other parameters or information. One or more of the parameters or information 1020 may be related to RRM measurements, although the scope of embodiments is not limited in this respect. One or more of the parameters or information 1020 may not necessarily be related to RRM measurements, although the scope of embodiments is not limited in this respect.

In a non-limiting example, the measurement type 1010 may indicate a type of reference signal (such as NR-SS, CSI-RS and/or other) to be used for an RRM measurement.

In some cases, if xSS(s) are sent in accordance with a relatively wide beam, a measurement may not be accurate enough for RRM purposes. In such cases, a measurement based on xRS(s) may be used, in some embodiments. Different options for measurement events based on xSS and/or xRS may be used. In some embodiments, the measurement(s) may be performed by a UE 102 while the UE 102 is in a connected mode, although the scope of embodiments is not limited in this respect.

In some embodiments, xSS may be used for synchronization and the encoded cell ID. It may be transmitted by a wider beam (in comparison to xRS) and/or different periodicity, in some cases. If an accuracy of measurement(s) using xSS is not sufficient for RRM measurement, additional reference signals (including but not limited to xRS) may be used for RRM purposes. In such cases, different options are possible, some of which are described herein.

In some embodiments, a measurement and event trigger based on both xSS and xRS may be used. For instance, a combined measurement and/or combined event trigger may be used, although the scope of embodiments is not limited in this respect. The gNB 105 (and/or other component of the network) may configure xSS and xRS for RRM(s). An event trigger may be based on measurement(s) based on xSS and xRS. The UE 102 may send a measurement report when a time-to-trigger (TTT) expires. In some embodiments, The gNB 105 (and/or other component of the network) may configure an xRS configuration to the UE 102 and/or a measurement configuration. The UE 102 may perform xSS and/or xRS measurements. An event trigger based on both xSS and xRS may occur, and the UE 102 may send a measurement report to the gNB 105. In some embodiments, the UE 102 may send the measurement report in response to the event trigger, although the scope of embodiments is not limited in this respect. In this case, an event for xSS and xRS may be used in a NR protocol and/or NR standard. It should be noted that embodiments are not limited to usage of an NR protocol and/or NR standard. One or more techniques described herein may be used in accordance with other protocols and/or standards, in some embodiments.

In some embodiments, two individual measurement events and two corresponding event triggers may be used. The measurement events may be individual events, although the scope of embodiments is not limited in this respect. In a non-limiting example, the gNB 105 (and/or other component of the network) may configure xSS for the RRM, and may configure a first trigger based on a measurement of the xSS. The UE 102 may send a first measurement report in response to the first event. In addition, the UE 102 may send the first measurement report when a first TTT expires (for instance, if the first event does not occur). Continuing the example, the gNB 105 (and/or other component of the network) may configure xRS for the RRM, and may configure a second trigger based on a measurement of the xRS. The UE 102 may send a second measurement report in response to the second event. In addition, the UE 102 may send the second measurement report when a second TTT expires (for instance, if the second event does not occur). In some embodiments, the xRS and the second event trigger may be configured after the first measurement report is sent by the UE 102. For instance, the xRS and the second event may be configured based on the first measurement report, in some cases. The scope of embodiments is not limited to this arrangement, however. The two events described above (and corresponding event triggers) may be configured in any chronological order. In some embodiments, the two events (and corresponding event triggers) may be configured together (such as with combined signaling).

In some embodiments, the gNB 105 (and/or other component of the network) may configure independent RRM measurement configurations for xSS and xRS. The gNB 105 (and/or other component of the network) may configure measurement(s) and/or event trigger(s). The gNB 105 (and/or other component of the network) may receive information from the UE 102 and may make a handover decision based at least partly on the received information. One way in which the network may configure this is to first use xSS measurement(s) to discover where the UE 102 is located. Then the network may use this information to configured xRS measurement(s) to get a more accurate and detailed measurement.

In a non-limiting example, one or more of the following operations may be performed. In Operation #1, the UE 102 may perform RRM measurement(s) on xSS (but not necessarily on xRS). In Operation #2, the UE 102 may determine, based on the RRM measurement(s) of the xSS, whether an event that triggers transmission of a measurement report has occurred. For instance, an RRM measurement may be compared to a threshold, and the event may occur if the RRM measurement is greater than the threshold. In Operation #3, the UE 102 may transmit, to the gNB 105, the measurement report that includes or is based on the RRM measurement(s) for the xSS. In Operation #4, the network (such as the gNB 105) may configure the UE 102 to perform one or more measurements based on xRS (which may include xRS in multiple cells, in some cases). In Operation #5, the UE 102 may transmit, to the gNB 105, another measurement report that includes or is based on the RRM measurement(s) for the xRS. In Operation #6, the network (such as the gNB 105) may make a handover decision for the UE 102 based at least partly on one or more of the measurement reports.

It should be noted that the example above is one method in which two independent measurement events may be configured and/or performed. Other arrangements are possible. For instance, the network (such as the gNB 105) may configure either the xSS or xRS (but not necessarily both). In a non-limiting example, RRM measurement(s) based on the xSS may be sufficient and therefore measurement(s) based on the xRS may not necessarily be configured. In another non-limiting example, the network (such as the gNB 105) may have knowledge of the location of the UE 102, and may not necessarily configure RRM measurements based on the xSS. In some embodiments, one or more signal quality measurements may be based on RSRP, RSRQ and/or RS-SINR, which may be measured based on xSS and/or xRS.

In some embodiments, one or more events (including but not limited to events A1-A6 described below) may be supported. The A1-A6 events may be included in a 3GPP LTE standard, NR standard and/or other standard, in some embodiments, although the scope of embodiments is not limited to events that are included in a standard. In an A1 event, a measurement related to a serving cell may become better than a threshold. In an A2 event, a measurement related to a serving cell may become worse than a threshold. In an A3 event, a measurement for a neighbor cell may become better (by an offset) than a measurement for a PCell and/or PSCell. In an A4 event, a measurement for a neighbor cell may become better than a threshold. In an A5 event, a measurement for a PCell and/or PSCell may become worse than a first threshold and a measurement for a neighbor cell may become better than a second threshold. In an A6 event, a measurement for a neighbor cell may become better (by an offset) than a measurement for an SCell.

In some embodiments, a measurement type parameter may be included in measurement configuration information (such as a "MeasConfigInformation" element in LTE). In some embodiments, the measurement type parameter may be included in a measurement object information (such as a "MeasObjectEUTRA" element in LTE).

In some embodiments, a measurement event may be a combined measurement event based on both xSS and/or xRS. In a non-limiting example, a combination of any of events A1-A6 may be used. Other events and/or measurements, including but not limited to those described herein, may also be used in some embodiments.

In a non-limiting example, an A3 event may be configured for an xSS measurement and an A1 event may be configured for an xRS measurement.

In some embodiments, a mapping between the xRS and a cell ID may be indicated by one or more of: a system information block (SIB), dedicated signaling, physical layer code and/or other element. The xRS may be configured by the network (such as the gNB 105) and the UE 102 may need to know and/or determine which the cell to which the UE 102 belongs. In this case, the network (such as the gNB 105) may broadcast such mapping(s) or may send a list of mappings via dedicated signaling to the UE 102. It is also possible that the physical layer may provide such coding so that the UE 102 may distinguish them.

In Example 1, an apparatus of a generation Node-B (gNB) may comprise memory. The apparatus may further comprise processing circuitry. The processing circuitry may be configured to encode, for transmission, a first control message that indicates a first radio resource management (RRM) measurement at a User Equipment (UE) based on new radio synchronization signals (NR-SS). The processing circuitry may be further configured to decode, from the UE, a first measurement report that indicates a first signal quality measurement based on the NR-SS. The processing circuitry may be further configured to determine, based on reception of the first measurement report, a transmission direction for transmission of channel state information reference signals (CSI-RS) for a second RRJ\1 measurement at the UE based on the CSIRS. The processing circuitry may be further configured to encode, for transmission, a second control message that indicates the second RRM measurement. The processing circuitry may be further configured to encode the CSI-RS for transmission in accordance with the determined transmission direction. The processing circuitry may be further configured to decode, from 5 the UE, a second measurement report that indicates a second signal quality measurement based on the CSI-RS. The processing circuitry may be further configured to determine, based at least partly on the first and second signal quality measurements, whether to initiate a handover of the UE from a serving cell to a neighbor cell. The memory may be configured to store at least a portion 10 of the first and second control messages.

In Example 2, the subject matter of Example 1, wherein the processing circuitry may be further configured to determine to initiate the handover of the UE to the neighbor cell if: the first signal quality measurement is less than a first threshold, and the second signal quality measurement is less than a second threshold.

In Example 3, the subject matter of one or any combination of Examples 1-2, wherein the processing circuitry may be further configured to encode, for transmission, a third control message to indicate a third RRM measurement based on CSI-RS from the neighbor cell. The processing circuitry may be further configured to decode a third measurement report from the UE that indicates a third signal quality measurement based on the CSI-RS from the neighbor cell. The processing circuitry may be further configured to determine whether to initiate the handover further based at least partly on the third signal quality measurement.

In Example 4, the subject matter of one or any combination of Examples 1-3, wherein the processing circuitry may be further configured to determine to initiate the handover if a difference between the third signal quality measurement and the second signal quality measurement is greater than a threshold.

In Example 5, the subject matter of one or any combination of Examples 1-4, wherein the processing circuitry may be further configured to encode the NR-SS for transmission in accordance with a first beam-width. The processing circuitry may be further configured to encode the CSI-RS for transmission in accordance with a second beam-width. The second beam-width may be less than the first beam-width.

In Example 6, the subject matter of one or any combination of Examples 1-5, wherein the first control message may include a predetermined threshold for the first signal quality measurement to trigger a transmission of the measurement report, by the UE.

In Example 7, the subject matter of one or any combination of Examples 1-6, wherein the first control message may indicate a trigger condition for transmission of the first measurement report. The trigger condition may be based on a threshold for the first signal quality measurement. The first signal quality measurement may be a reference signal received power (RSRP), a reference signal received quality (RSRQ) or a reference signal signal-to-interference-plus-noise ratio (RS-SINR).

In Example 8, the subject matter of one or any combination of Examples 1-7, wherein the second control message may indicate a trigger condition for transmission of the second measurement report. The trigger condition may be based on a threshold for the second signal quality measurement. The second signal quality measurement may be a reference signal received power (RSRP), a reference signal received quality (RSRQ) or a reference signal signal-to-interference-plus-noise ratio (RS-SINR).

In Example 9, the subject matter of one or any combination of Examples 1-8, wherein the processing circuitry may be further configured to, if the first signal quality measurement is less than or equal to a threshold: determine the transmission direction, encode the second control message for transmission, and encode the CSI-RS for transmission. The processing circuitry may be further configured to, if the first signal quality measurement is greater than the threshold: determine whether to initiate the handover of the UE to the neighbor cell based on the first signal quality measurement.

In Example 10, the subject matter of one or any combination of Examples 1-9, wherein the NR-SS may be configured based on the serving cell. The CSI-RS may be configured for the UE.

In Example 11, the subject matter of one or any combination of Examples 1-10, wherein the processing circuitry may be further configured to encode, for transmission, a third control message that indicates a mapping between the CSI-RS and a cell identifier (ID) of the serving cell. The third control message may include a system information block (SIB), dedicated signaling or a physical layer code.

In Example 12, the subject matter of one or any combination of Examples 1-11, wherein the first or second signal quality measurement may be a signal to noise ratio (SNR).

In Example 13, the subject matter of one or any combination of Examples 1-12, wherein the gNB may be arranged to operate in accordance with a New Radio (NR) protocol.

In Example 14, the subject matter of one or any combination of Examples 1-13, wherein the apparatus may further include a transceiver to transmit the first and second control messages.

In Example 15, the subject matter of one or any combination of Examples 1-14, wherein the processing circuitry may include a baseband processor to encode the first and second control messages.

In Example 16, a computer-readable storage medium may store instructions for execution by one or more processors to perform operations for communication by a generation Node-B (gNB). The operations may configure the one or more processors to encode, for transmission to a plurality of transmit-receive points (TRPs) of a cell in which the gNB operates, one or more control messages that indicate new radio synchronization signals (NR-SS) to be transmitted by the TRPs for radio resource management (RRM) measurements. The operations may further configure the one or more processors to decode, from a User Equipment (UE), a measurement report that indicates a plurality of signal quality measurements based on NR-SS received from the TRPs. The operations may further configure the one or more processors to determine, based on the signal quality measurements, a combined signal quality measurement for the cell in which the gNB operates. The operations may further configure the one or more processors to determine, based on the combined signal quality measurement, whether to initiate a handover of the UE to a neighbor cell.

In Example 17, the subject matter of Example 16, wherein the gNB may be located at a different location than at least one of the TRPs.

In Example 18, the subject matter of one or any combination of Examples 16-17, wherein the operations may further configure the one or more processors to determine to initiate the handover of the UE to the neighbor cell if the combined signal quality measurement is less than a threshold.

In Example 19, the subject matter of one or any combination of Examples 16-18, wherein the operations may further configure the one or more processors to decode another measurement report from the UE that indicates a signal quality measurement based on NR-SS received from the neighbor cell. The operations may further configure the one or more processors to determine, based on a comparison of the combined signal quality measurement and the signal quality measurement based on the NR-SS from the neighbor cell, whether to initiate a handover of the UE to the neighbor cell.

In Example 20, an apparatus of a User Equipment (UE) may comprise memory. The apparatus may further comprise processing circuitry. The processing circuitry may be configured to decode, from a generation Node-B (gNB), one or more control messages that indicate: a first measurement event that occurs if a first signal quality measurement based on received new radio synchronization signals (NR-SS) is greater than a first threshold, the NR-SS configured for a cell in which the gNB operates; and a second measurement event that occurs if a second signal quality measurement based on received channel state information reference signals (CSI-RS) is greater than a second threshold, the CSI-RS configured for the UE. The processing circuitry may be further configured to determine the first and second signal quality measurements. The processing circuitry may be further configured to, if both the first and second measurement events occur: encode, for transmission, a measurement report that includes the first and second signal quality measurements. The memory may be configured to store the first and second signal quality measurements.

In Example 21, the subject matter of Example 20, wherein the one or more control messages may include the first and second thresholds.

In Example 22, the subject matter of one or any combination of Examples 20-21, wherein the processing circuitry may be further configured to, if either of the first and second measurement events does not occur: monitor a time-to-trigger (TTT); refrain from transmission of the measurement report while the TTT is monitored and while either of the first and second measurement events does not occur; and encode the measurement report for transmission after an expiration of the TTT.

In Example 23, the subject matter of one or any combination of Examples 20-22, wherein the UE may be arranged to operate in accordance with a New Radio (NR) protocol. The cell in which the gNB operates may be a serving cell. The received NR-SS may be from the gNB. The first measurement event may be configurable to be one or more of: an A1 event that occurs if the first signal quality measurement is greater than the first threshold; an A2 event that occurs if the first signal quality measurement is less than or equal to the first threshold; and an A4 event that occurs if another signal quality measurement based on NR-SS received from a neighbor cell is greater than another threshold.

In Example 24, the subject matter of one or any combination of Examples 20-23, wherein the first measurement event may be further configurable to be one or more of: an A3 event that occurs if a difference between another signal quality measurement for a neighbor cell and a signal quality measurement for a primary cell (PCell) of the gNB or a primary secondary cell (PSCell) of the gNB is greater than a predetermined offset; an A5 event that occurs if another signal quality measurement for a PCell of the gNB and/or a PSCell of the gNB is less than a first threshold and a signal quality measurement for a neighbor cell is greater than a second threshold; and an A6 event that occurs if a difference between another signal quality measurement for a neighbor cell and another signal quality measurement of a secondary cell (SCell) of the gNB is greater than another predetermined offset.

In Example 25, an apparatus of a generation Node-B (gNB) may comprise memory. The apparatus may further comprise processing circuitry. The processing circuitry may be configured to encode, for transmission, one or more control messages that indicate: one or more radio resource management (RMM) measurements at the UE; and one or more trigger conditions for transmission of one or more measurement reports, by the UE, based on the RRM measurements. The RRM measurements may be based on one of: new radio synchronization signals (NR-SS) and channel state information reference signals (CSI-RS). The RRM measurements may be further based on one of: a reference signal received power (RSRP), a reference signal received quality (RSRQ) and a reference signal signal-to-interference-plus-noise ratio (RS-SINR). The memory may be configured to store at least a portion of the control messages.

In Example 26, the subject matter of Example 25, wherein the processing circuitry may be further configured to, if one of the RRM measurements is based on the NR-SS: encode the NR-SS for transmission. The processing circuitry may be further configured to, if one of the RRM measurements is based on the CSI-RS: encode the CSI-RS for transmission.

In Example 27, an apparatus of a generation Node-B (gNB) may comprise means for encoding, for transmission to a plurality of transmit-receive points (TRPs) of a cell in which the gNB operates, one or more control messages that indicate new radio synchronization signals (NR-SS) to be transmitted by the TRPs for radio resource management (RMM) measurements. The apparatus may further comprise means for decoding, from a User Equipment (UE), a measurement report that indicates a plurality of signal quality measurements based on NR-SS received from the TRPs. The apparatus may further comprise means for determining, based on the signal quality measurements, a combined signal quality measurement for the cell in which the gNB operates. The apparatus may further comprise means for determining, based on the combined signal quality measurement, whether to initiate a handover of the UE to a neighbor cell.

In Example 28, the subject matter of Example 27, wherein the gNB may be located at a different location than at least one of the TRPs.

In Example 29, the subject matter of one or any combination of Examples 27-28, wherein the apparatus may further comprise means for determining to initiate the handover of the UE to the neighbor cell if the combined signal quality measurement is less than a threshold.

In Example 30, the subject matter of one or any combination of Examples 27-29, wherein the apparatus may further comprise means for decoding another measurement report from the UE that indicates a signal quality measurement based on NR-SS received from the neighbor cell. The apparatus may further comprise means for determining, based on a comparison of the combined signal quality measurement and the signal quality measurement based on the NR-SS from the neighbor cell, whether to initiate a handover of the UE to the neighbor cell.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
memory; and
processing circuitry, configured to:
    encode, for transmission, a first control message that indicates a first radio resource management (RRM) measurement at a User Equipment (UE) based on new radio synchronization signals (NR-SS);
    decode, from the UE, a first measurement report that indicates a first signal quality measurement based on the NR-SS;
    determine, based on reception of the first measurement report, a transmission direction for transmission of channel state information reference signals (CSI-RS) for a second RRM measurement at the UE based on the CSI-RS;
    encode, for transmission, a second control message that indicates the second RRM measurement;
    encode the CSI-RS for transmission in accordance with the determined transmission direction;
    decode, from the UE, a second measurement report that indicates a second signal quality measurement based on the CSI-RS; and
    determine, based at least partly on the first and second signal quality measurements, whether to initiate a handover of the UE from a serving cell to a neighbor cell, wherein the handover of the UE from the serving cell to the neighbor cell is initiated when the first signal quality measurement is less than a first threshold and the second signal quality measurement is less than a second threshold; and
wherein the memory is configured to store at least a portion of the first and second control messages.

2. The apparatus according to claim 1,
the processing circuitry further configured to:
    encode, for transmission, a third control message to indicate a third RRM measurement based on CSI-RS from the neighbor cell;
    decode a third measurement report from the UE that indicates a third signal quality measurement based on the CSI-RS from the neighbor cell; and
    determine whether to initiate the handover further based at least partly on the third signal quality measurement.

3. The apparatus according to claim 2,
the processing circuitry further configured to:
    determine to initiate the handover if a difference between the third signal quality measurement and the second signal quality measurement is greater than a threshold.

4. The apparatus according to claim 1,
the processing circuitry further configured to:
    encode the NR-SS for transmission in accordance with a first beam-width; and
    encode the CSI-RS for transmission in accordance with a second beam-width, wherein the second beam-width is less than the first beam-width.

5. The apparatus according to claim 1,
wherein:
    the first control message includes a predetermined threshold for the first signal quality measurement to trigger a transmission of the measurement report, by the UE.

6. The apparatus according to claim 1,
wherein:
    the first control message indicates a trigger condition for transmission of the first measurement report, the trigger condition is based on a threshold for the first signal quality measurement, and the first signal quality measurement is a reference signal received power (RSRP), a reference signal received quality (RSRQ) or a reference signal signal-to-interference-plus-noise ratio (RS-SINR).

7. The apparatus according to claim 1, wherein:

the second control message indicates a trigger condition for transmission of the second measurement report, the trigger condition is based on a threshold for the second signal quality measurement, and the second signal quality measurement is a reference signal received power (RSRP), a reference signal received quality (RSRQ) or a reference signal signal-to-interference-plus-noise ratio (RS-SINR).

8. The apparatus according to claim 1, the processing circuitry further configured to:

if the first signal quality measurement is less than or equal to a threshold: determine the transmission direction, encode the second control message for transmission, and encode the CSI-RS for transmission; and if the first signal quality measurement is greater than the threshold: determine whether to initiate the handover of the UE to the neighbor cell based on the first signal quality measurement.

9. The apparatus according to claim 1, wherein:

the NR-SS are configured based on the serving cell, and the CSI-RS are configured for the UE.

10. The apparatus according to claim 1, the processing circuitry further configured to:

encode, for transmission, a third control message that indicates a mapping between the CSI-RS and a cell identifier (ID) of the serving cell, wherein the third control message includes a system information block (SIB), dedicated signaling or a physical layer code.

11. The apparatus according to claim 1, wherein:

the first or second signal quality measurement is a signal to noise ratio (SNR).

12. The apparatus according to claim 1, wherein the base station is arranged to operate in accordance with a New Radio (NR) protocol.

13. The apparatus according to claim 1, wherein the apparatus further includes a transceiver to transmit the first and second control messages.

14. The apparatus according to claim 1, wherein the processing circuitry includes a baseband processor to encode the first and second control messages.

15. A non-transitory computer-readable storage medium that stores instructions for execution by one or more processors to perform operations for communication by a base station, the operations to configure the one or more processors to:

encode, for transmission to a plurality of transmit-receive points (TRPs) of a cell in which the base station operates, one or more control messages that indicate new radio synchronization signals (NR-SS) to be transmitted by the TRPs for radio resource management (RRM) measurements;

decode, from a User Equipment (UE), a measurement report that indicates a plurality of signal quality measurements based on NR-SS and CSI-RS received from the TRPs;

determine, based on the plurality of signal quality measurements, a combined signal quality measurement for the cell in which the base station operates; and determine, based on the combined signal quality measurement, whether the handover of the UE from the cell to a neighbor cell is initiated when a first signal quality measurement is less than a first threshold and a second signal quality measurement is less than a second threshold.

16. The non-transitory computer-readable storage medium according to claim 15, wherein the base station is located at a different location than at least one of the TRPs.

17. The non-transitory computer-readable storage medium according to claim 15, the operations to further configure the one or more processors to:

determine to initiate the handover of the UE to the neighbor cell if the combined signal quality measurement is less than a threshold.

18. The non-transitory computer-readable storage medium according to claim 15, the operations to further configure the one or more processors to:

decode another measurement report from the UE that indicates a signal quality measurement based on NR-SS received from the neighbor cell; and determine, based on a comparison of the combined signal quality measurement and the signal quality measurement based on the NR-SS from the neighbor cell, whether to initiate a handover of the UE to the neighbor cell.

19. An apparatus, comprising:
memory; and
processing circuitry, configured to:

decode, from a base station, one or more control messages that indicate:

a first measurement event that occurs if a first signal quality measurement based on received new radio synchronization signals (NR-SS) is greater than a first threshold, the NR-SS configured for a cell in which the base station operates, and a second measurement event that occurs if a second signal quality measurement based on received channel state information reference signals (CSI-RS) is greater than a second threshold, the CSI-RS configured for the UE;

determine the first and second signal quality measurements;

if both the first and second measurement events occur:

encode, for transmission, a measurement report that includes the first and second signal quality measurements, wherein the memory is configured to store the first and second signal quality measurements; and receive, from the base station, an indication of a handover from the cell to a neighbor cell based on the first signal quality measurement being less than a first threshold and the second signal quality measurement being less than a second threshold.

20. The apparatus according to claim 19, wherein the one or more control messages include the first and second thresholds.

21. The apparatus according to claim 19,
the processing circuitry further configured to:
  if either of the first and second measurement events does not occur:
    monitor a time-to-trigger (TTT);
    refrain from transmission of the measurement report while the TTT is monitored and while either of the first and second measurement events does not occur; and
    encode the measurement report for transmission after an expiration of the TTT.

22. The apparatus according to claim 19,
wherein:
  the UE is arranged to operate in accordance with a New Radio (NR) protocol,
  the cell in which the base station operates is a serving cell,
  the received NR-SS are from the base station, and
  the first measurement event is configurable to be one or more of:
    an A1 event that occurs if the first signal quality measurement is greater than the first threshold,
    an A2 event that occurs if the first signal quality measurement is less than or equal to the first threshold, and
    an A4 event that occurs if another signal quality measurement based on NR-SS received from a neighbor cell is greater than another threshold.

23. The apparatus according to claim 22,
wherein:
  the first measurement event is further configurable to be one or more of:
    an A3 event that occurs if a difference between another signal quality measurement for a neighbor cell and a signal quality measurement for a primary cell (PCell) of the base station or a primary secondary cell (PSCell) of the base station is greater than a predetermined offset,
    an A5 event that occurs if another signal quality measurement for a PCell of the base station and/or a PSCell of the base station is less than a first threshold and a signal quality measurement for a neighbor cell is greater than a second threshold, and
    an A6 event that occurs if a difference between another signal quality measurement for a neighbor cell and another signal quality measurement of a secondary cell (SCell) of the base station is greater than another predetermined offset.

24. An apparatus, comprising:
memory; and
processing circuitry, configured to:
  encode, for transmission, one or more control messages that indicate:
    one or more radio resource management (RRM) measurements at the UE, and
    one or more trigger conditions for transmission of one or more measurement reports, by the UE, based on the RRM measurements,
  wherein the RRM measurements are based on one of:
    new radio synchronization signals (NR-SS) and channel state information reference signals (CSI-RS),
  wherein the RRM measurements are further based on one of:
    a reference signal received power (RSRP), a reference signal received quality (RSRQ) and a reference signal signal-to-interference-plus-noise ratio (RS-SINR),
  wherein the one or more trigger conditions include:
    a first measurement event that occurs when a first signal quality measurement based on received new radio synchronization signals (NR-SS) is greater than a first threshold, the NR-SS configured for a cell in which the base station operates, and
    a second measurement event that occurs when a second signal quality measurement based on received channel state information reference signals (CSI-RS) is greater than a second threshold, the CSI-RS configured for the UE; and
  determine, based at least partly on the first and second signal quality measurements, whether to initiate a handover of the UE from a serving cell to a neighbor cell, wherein the handover of the UE from the serving cell to the neighbor cell is initiated when the first signal quality measurement is less than a first threshold and the second signal quality measurement is less than a second threshold; and
wherein the memory is configured to store at least a portion of the control messages.

25. The apparatus according to claim 24,
the processing circuitry further configured to:
  if one of the RRM measurements is based on the NR-SS, encode the NR-SS for transmission; and
  if one of the RRM measurements is based on the CSI-RS, encode the CSI-RS for transmission.

26. The apparatus according to claim 25,
wherein the NR-SS for transmission is encoded in accordance with a first beam-width; and
wherein the CSI-RS for transmission is encoded in accordance with a second beam-width.

* * * * *